Patented May 18, 1943

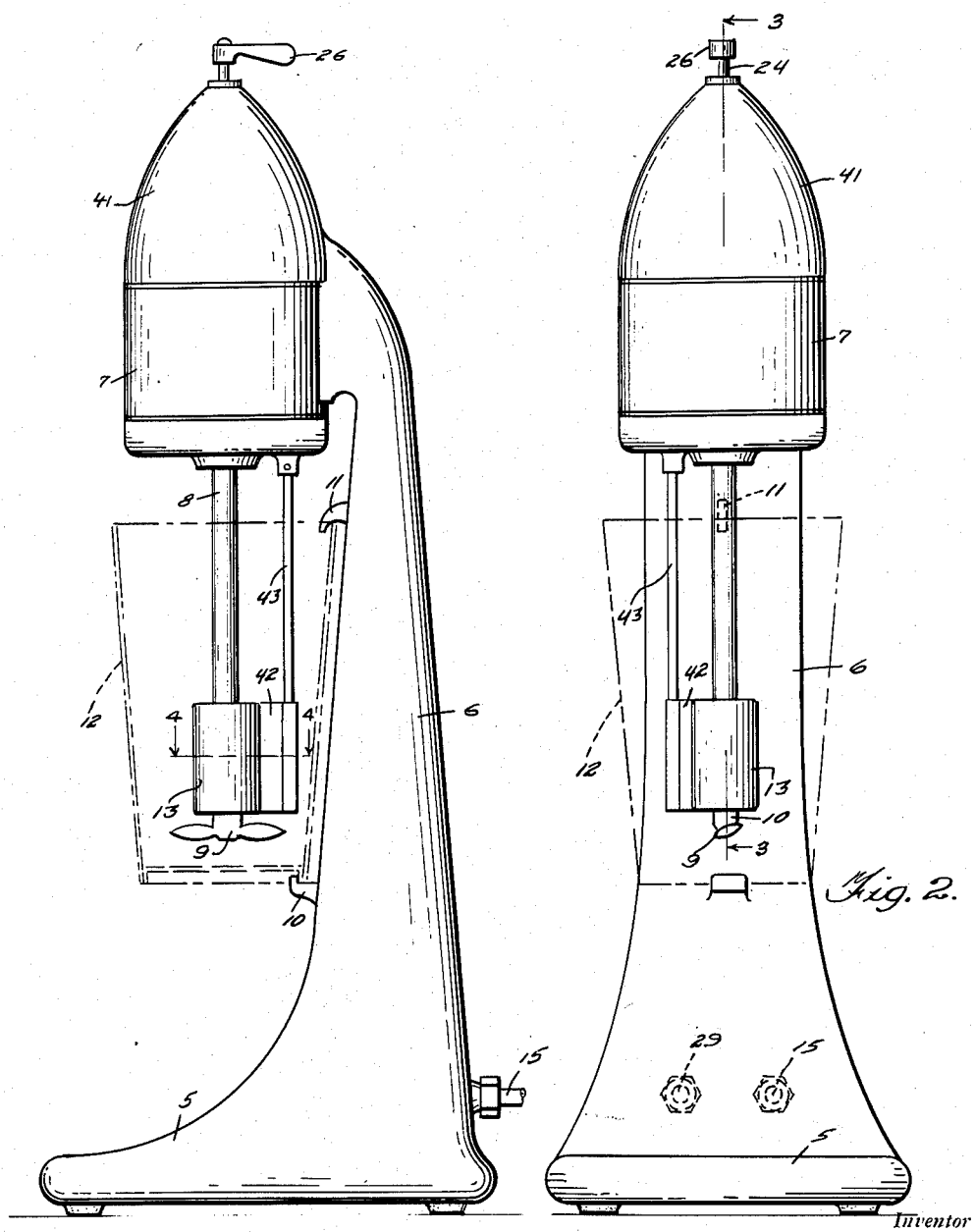

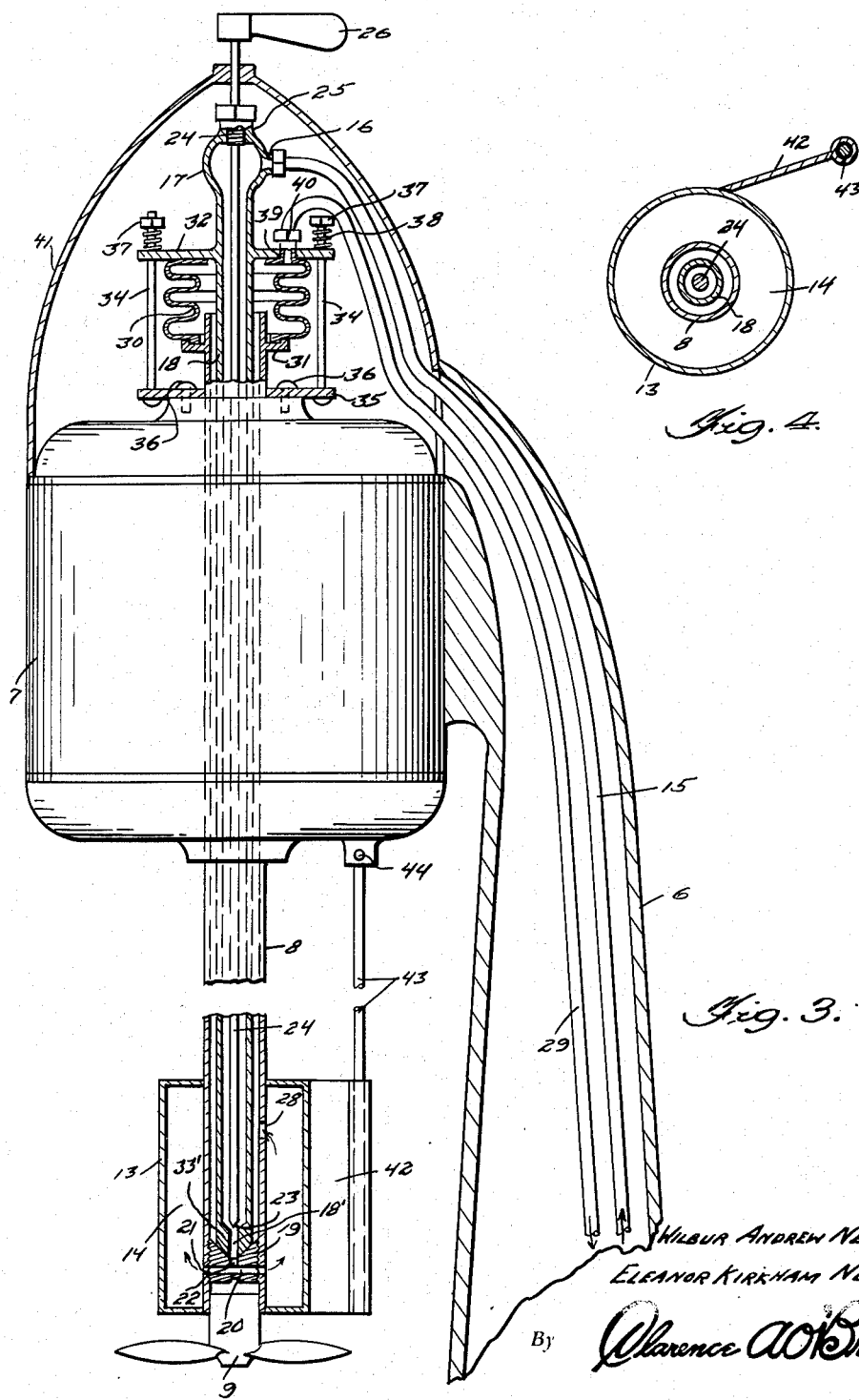

2,319,429

UNITED STATES PATENT OFFICE 2,319,429

BEVERAGE MIXER AND COOLER

Wilbur Andrew Nelson and Eleanor Kirkham Nelson, South Bend, Wash.

Application April 8, 1941, Serial No. 387,528

3 Claims. (Cl. 257—120)

This invention has reference to a device for use in the mixing and cooling of such beverages as milk shakes and the like and which are generally served in a cool state to the purchasing public.

An object of the present invention is to combine in a single structure means for agitating the beverage and simultaneously with such agitation to cool the beverage to the desired degree.

A further object of the invention is to provide in a device of this character means whereby the cooling or lowering of the temperature of the beverage takes place from inside, as distinguished from the cooling of the beverage from the exterior of the container in which the beverage is placed for the mixing and/or agitation thereof.

A further object of the invention is to provide a device or mechanism of this character which can be used commercially in drug stores, restaurants, and the like, and also in private homes to advantage over the types of beverage mixers or agitators now generally employed.

The invention, together with its objects and advantages, will be best understood from a study of the following description taken in connection with the accompanying drawings wherein:

Figure 1 is a side elevational view of a beverage mixer and cooler embodying the features of the present invention.

Figure 2 is a front elevational view of the device.

Figure 3 is an enlarged vertical detail view taken substantially on the line 3—3 of Figure 2 and showing certain parts in section and other parts in elevation.

Figure 4 is a detail horizontal sectional view taken substantially on the line 4—4 of Figure 1.

Referring more in detail to the drawings it will be seen that in the preferred embodiment thereof the invention comprises a stand of suitable shape and design and characterized by a base 5 from which rises a hollow post or supporting arm 6 on the upper end of which is suitably mounted and secured an electric motor 7.

The motor 7 is characterized by having a tubular armature shaft 8 that extends above and below the casing of the motor and on the lower end of the shaft 8 is suitably secured an agitator 9.

The post 6 is also provided with vertically spaced receptacle-engaging elements 10, 11 for engaging and retaining in position on the device a receptacle such as suggested by broken lines in Figure 1 and indicated by the reference numeral 12, and in which receptacle, the same being generally made of some metallic material, the liquid and other ingredients of the drink to be mixed is placed for the mixing and cooling of the same preparatory to the serving of the beverage.

Suitably mounted on the lower end of the shaft 8 is a drum 13 through which the lower end of the shaft extends as shown in Figure 3, and which drum forms a refrigerating chamber 14.

A refrigerating gas is supplied to the drum 14 from a source of supply through the medium of a flexible conduit 15 leading from such source of supply and trained upwardly through the post 6.

The conduit 15 is connected as at 16 with the bulbous-shaped head 17 of a stationary tube 18 that extends through the shaft 8, and at its lower end is tapered to conformably seat in a conical recess provided therefor in one end of a plug 19 threadedly secured in the lower end of the shaft as shown in Fig. 3.

The plug 19 is provided with a passage 20 that at its opposite ends register with ports 21 provided in the lower end of the shaft 8 within the confines of the chamber 14.

The plug 19 is also provided with an inlet orifice 22 for the passage 20 and this orifice is in alignment with an axial passage or orifice 18' provided in the lower end of the valve tube 18. Flow through this orifice 18' is controlled by a needle valve 23 on one end of an elongated valve stem 24 as clearly shown in Figure 3.

The valve stem 24 extends through the tube 18 and adjacent its upper end is provided with a threaded section 24 that complements the threaded neck 25 provided on the head 17 of tube 18 whereby, upon rotation of the stem 24 in the proper direction, the latter will be caused to move axially or longitudinally relative to the tube 18 for effecting a seating or unseating of the valve 23 as desired.

To facilitate rotation of the valve stem 24 the latter on the upper end thereof is provided with a suitable handle 26. It will thus be seen that with the valve 23 in open position as shown in Figure 3, the refrigerating gas from the source of supply will pass through the tube 18 and from the tube through the passage 20 and ports 21 into the refrigerating chamber 14 and thus the contents of the receptacle 12 will be cooled during the agitation of such contents.

To provide for a continuous circulation of the refrigerant the shaft 8 above the ports 21 is provided with a single port 28 through which the refrigerant in gaseous or vapor form escapes from the chamber 14 into the shaft 28 to pass upwardly thereof and be drawn off through the medium of a flexible hose or conduit 29 that is housed within the hollow of the standard 6 and may be connected to a suitable suction mechanism.

To seal the upper end of the shaft 8 against the escape of the gaseous fumes or vapors, there is provided a bellows 30. The bellows 30 has one end thereof seating within a cup 31 formed integral with the upper end of the shaft 8 as shown in Figure 3, while the other end of the bellows is secured to a relatively rigid plate 32.

The plate 32 is apertured to receive stud bolts 34 that extend upwardly from a plate 35 bolted or otherwise secured as at 36 to the casing of the motor 7.

Threaded on the upper ends of the bolts 34 are nuts 37, and interposed between the nuts 37 and the plate 32 are coil springs 38. Thus it will be seen that the bellows 30 provide an expansible chamber at the upper end of the shaft 8 to receive the gases escaping from the refrigerating drum 14.

The bellows 30 are provided with a suitable outlet 39 to which is suitably connected, as at 40, one end of the draw-off conduit or tube 29.

Supported by the casing of the motor 7 and enclosing the upper end of the tube 18 and associated parts is a suitably shaped hood 41 that at its major or larger end telescopes an end of the casing of the motor 7, and at its smaller or minor end is suitably apertured to accommodate the upper end of the valve stem 24. Thus it will be seen that the hood 14 gives to the structure a complete finished appearance.

Also to maintain the exterior of the wall of the drum 13 free from accumulations of ice cream or other ingredients of the beverage being mixed and cooled, there is provided a scraper blade 42 that is disposed somewhat tangentially with respect to the drum 13 for wiping engagement with the drum as suggested in Figure 4.

The blade 42 is secured on the lower end of a rod 43 that is disposed in spaced parallelism to the motor shaft 8 and is secured at its upper end to the lower end of the casing of the motor 7 as at 44.

It will thus be seen that the drum 13 and blade 42 are accommodated within the container 12 and will in no wise interfere with the proper positioning of the receptacle or container 12.

It will be apparent that the supply of the refrigerant to the chamber 14 is controlled by manual manipulation of the handle 26 for positioning the valve 23 with respect to the plug 19 which forms a seat for the valve 23.

It will also be apparent that a device of this character will be found to facilitate the serving of cool beverages such as milk shakes and the like, providing as it does for both the agitation of the ingredients of the beverage and the cooling of such beverage during the course of such agitation.

The above and numerous other advantages of a mixer and cooler embodying the features of the present invention will readily present themselves to those skilled in the art.

While we have herein illustrated and described the preferred embodiment of the invention, it is to be understood that we claim all such forms of the invention to which we are entitled in view of the scope of the appended claims.

Having thus described the invention what is claimed as new is:

1. In a beverage mixer and cooler, a stand embodying a base having a post rising therefrom, an electric motor mounted on said post and equipped with a vertically disposed hollow shaft, an agitator on the lower end of said shaft, a drum on the lower end of said shaft above said agitator and presenting a chamber substantially circumjacent said shaft, said shaft in the region of said drum having inlet and outlet openings therein, communicating with the chamber, conduit means communicating with the respective openings in the shaft for circulating a refrigerant through the chamber, a valve in the shaft controlling one of said openings of the shaft, and control means for the valve outwardly of the shaft.

2. In a beverage mixer and cooler, a stand embodying a base having a standard rising therefrom, a motor mounted on said standard and having a vertically disposed tubular agitator shaft, an agitator on the lower end of said shaft, a hollow drum on said shaft above said agitator, and adapted to receive a refrigerant, said hollow shaft within the confines of said drum being provided with apertures, a plug in said shaft provided with a passage registering at its ends with said apertures and also provided with an orifice providing an inlet for said passage, a tubular valve casing disposed within the hollow of said shaft and having one end seated against said plug, a valve stem shiftable axially of said tubular casing and provided at one end with a needle valve movable with the stem into and out of engagement with the plug for opening and closing the orifice in said plug, and conduit means connected with said tubular casing for supplying a refrigerant to said drum through said casing, the refrigerant with the valve in unseated position passing through the passage in said plug and the apertures in said shaft into said drum.

3. In a beverage mixer and cooler, a stand embodying a base having a standard rising therefrom, a motor mounted on said standard and having a vertically disposed tubular agitator shaft, an agitator on the lower end of said shaft, a hollow drum on said shaft above said agitator, and adapted to receive a refrigerant, said hollow shaft within the confines of said drum being provided with apertures, a plug in said shaft provided with a passage registering at its ends with said apertures and also provided with an orifice providing an inlet for said passage, a tubular valve casing disposed within the hollow of said shaft and having one end seated against said plug, a valve stem shiftable axially of said tubular casing and provided at one end with a needle valve movable with the stem into and out of engagement with the plug for opening and closing the orifice in said plug, and conduit means connected with said tubular casing for supplying a refrigerant to said drum through said casing, the refrigerant with the valve in unseated position passing through the passage in said plug and the apertures in said shaft into said drum, said shaft also having an opening therein for the escape of gaseous vapors from said drum through the shaft, and conduit means connected with said shaft for drawing off said escaping vapors.

WILBUR ANDREW NELSON.
ELEANOR KIRKHAM NELSON.